(12) United States Patent
Boege (10) Patent No.: US 11,029,505 B1
(45) Date of Patent: Jun. 8, 2021

(54) LOW-AUTOFLUORESCENCE AND LOW-REFLECTANCE OPTICAL COMPONENTS FOR MICROSCOPES, AND MICROSCOPES UTILIZING SAME

(71) Applicant: Molecular Devices, LLC, San Jose, CA (US)

(72) Inventor: Steven J Boege, San Mateo, CA (US)

(73) Assignee: Molecular Devices, LLC, Sunnyvale, CA (US)

( * ) Notice: Subject to any disclaimer, the term of this patent is extended or adjusted under 35 U.S.C. 154(b) by 130 days.

(21) Appl. No.: 16/042,528

(22) Filed: Jul. 23, 2018

Related U.S. Application Data (62) Division of application No. 15/074,477, filed on Mar. 18, 2016, now Pat. No. 10,054,776.

(60) Provisional application No. 62/145,347, filed on Apr. 9, 2015.

(51) Int. Cl.
*G02B 21/00* (2006.01)
*G02B 1/00* (2006.01)

(52) U.S. Cl.
CPC ..... *G02B 21/0032* (2013.01); *G02B 21/0044* (2013.01); *G02B 21/0076* (2013.01); *G02B 1/00* (2013.01)

(58) Field of Classification Search
CPC ...... G02B 1/00; G02B 21/00; G02B 21/0004; G02B 21/002; G02B 21/0024; G02B 21/0032; G02B 21/0036; G02B 21/0044; G02B 21/0076
USPC ........ 359/362, 363, 368, 369, 385, 388, 389
See application file for complete search history.

(56) References Cited

U.S. PATENT DOCUMENTS

| | | | |
|---|---|---|---|
| 6,307,690 B1 | 10/2001 | Czarnetzki et al. | |
| 7,075,714 B2 * | 7/2006 | Yonetani | G02B 1/115 359/363 |
| 10,054,776 B1 * | 8/2018 | Boege | G02B 21/0076 |
| 2015/0042779 A1 | 2/2015 | Hayashi | |

* cited by examiner

*Primary Examiner* — Arnel C Lavarias
(74) *Attorney, Agent, or Firm* — Merchant & Gould P.C.

(57) ABSTRACT

An optical component for a microscope may include a low-autofluorescence substrate, or a substrate and a high-performance anti-reflective layer coating the substrate. An optical component may include a low-autofluorescence substrate and high-performance anti-reflective layer coating the low-autofluorescence substrate. The high-performance anti-reflective layer may be a low-autofluorescence high-performance anti-reflective layer. A microscope may include one or more such optical components.

17 Claims, 5 Drawing Sheets

FIG. 5

LOW-AUTOFLUORESCENCE AND LOW-REFLECTANCE OPTICAL COMPONENTS FOR MICROSCOPES, AND MICROSCOPES UTILIZING SAME

RELATED APPLICATION

This application claims priority to U.S. provisional application No. 62/145,347 filed on Apr. 9, 2015, and is a divisional of U.S. patent application Ser. No. 15/074,477 filed on Mar. 18, 2016, the contents of which are incorporated herein by reference in its entirety.

TECHNICAL FIELD

The present invention relates generally to confocal microscopy and particularly to spinning disks utilized in confocal microscopy.

BACKGROUND

Microscopes are employed in a wide variety of fields to view various types of biological and non-biological samples. In some applications, for example in certain applications of life sciences, confocal microscopes are preferred over more traditional wide-field microscopes. In a confocal microscope, light is passed through a small aperture (traditionally a pinhole) positioned at an optically conjugate plane. The point illumination substantially eliminates out-of-focus light (background signal) and thereby increases the optical resolution and contrast of the image acquired. However, these advantages are realized at the expense of decreased light intensity caused by the confocal aperture, such that longer exposure times are often required in comparison to wide-field microscopes.

As only a single small point on the sample is illuminated at any time, the confocal microscope often provides a scanning function. One type of scanning technique entails the use of a spinning disk, also known as a scanning disk or Nipkow disk. A typical spinning disk includes multiple apertures arranged along one or more spiral paths. Scanning is implemented by spinning the disk at a high angular velocity, for example thousands of revolutions per minute (RPM).

Two problems associated with microscopes, including confocal microscopes such as spinning disk microscopes, are reflectance of stray light from optical components and autofluorescence exhibited by optical components (i.e., generation of secondary stray light in an optical component). Reflected stray light includes light that is not part of the image of the sample and, in the case of fluorescence microscopy, light that is not part of the fluorescent response of the sample. Autofluorescence in optical components is generated by color centers in such optical components. The color centers are due to the presence of rare earth elements and other impurities in the material (e.g., optical glass or polymer) of the optical components. Optical components that may exhibit unacceptably high reflectance and autofluorescence include the spinning disk as well as lenses and windows positioned on the optical axis of the microscope.

Conventionally, these problems have been addressed by coating such optical components with a conventional material specified as being a low-reflectance material or an anti-reflective material. Additionally, the microscope may include an emission filter effective for blocking a large portion of unwanted light. Nevertheless, even when such measures are taken an unacceptable amount of stray light and autofluorescence-based light may reach the imaging device of the microscope. This "ghost" light has the appearance of background in confocal images, thus lowering signal-to-background ratio for a given exposure time or increasing the exposure time required to attain a desired signal-to-background ratio. Therefore, it would be desirable to reduce the amount of stray light reflected from optical components and light emitted from optical components due to autofluorescence.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, an optical component for a microscope includes a low-autofluorescence substrate.

According to another embodiment, an optical component for a microscope includes a substrate and a high-performance anti-reflective layer coating the substrate.

According to another embodiment, an optical component for a microscope includes a low-autofluorescence substrate and a high-performance anti-reflective layer coating the low-autofluorescence substrate.

According to another embodiment, a microscope includes: a light source configured for producing excitation light; a light detector configured for acquiring an image of the sample; and optics defining an excitation light path from the light source to the sample, and an emission light path from the sample to the light detector, wherein the optics comprise an optical component, and the optical component comprises a low-autofluorescence substrate, or a substrate and a high-performance anti-reflective coating the substrate, or both of the foregoing.

According to another embodiment, a method for acquiring microscopic images of a sample includes: operating a microscope according to any of the embodiments disclosed herein to irradiate a sample with excitation light and collect emission light emitted by the sample, wherein the excitation light and/or the emission light passes through the optical component comprising the low-autofluorescence substrate.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
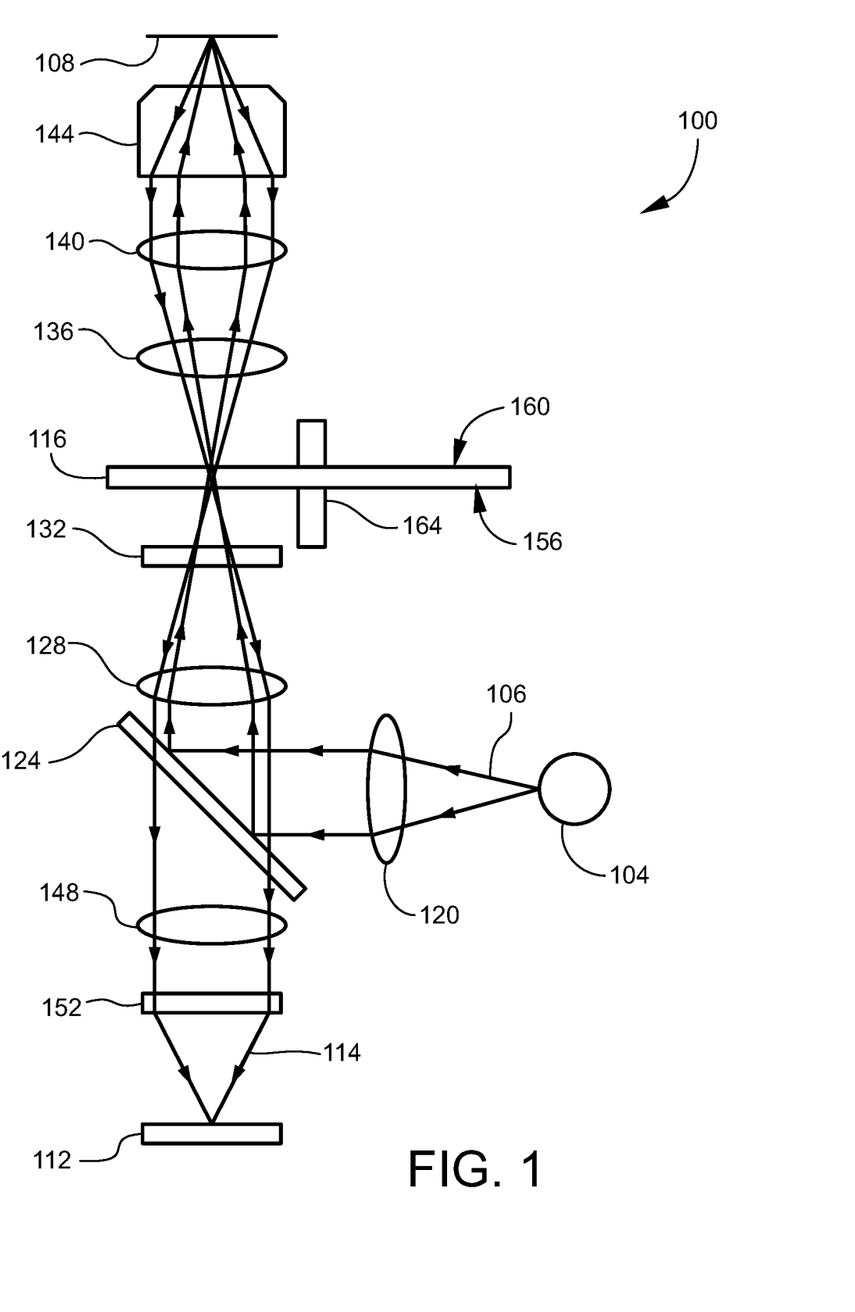
FIG. 1 is a schematic view of an example of a confocal microscope according to some embodiments.

FIG. 1 is a schematic view of an example of a confocal microscope 100 according to some embodiments. Generally, the structure and operation of various types of microscopes are understood by persons skilled in the art, and thus certain components and features of the microscope 100 are described only briefly to facilitate an understanding of the subject matter taught herein. The microscope 100 may generally include a light source 104 configured for generating excitation light 106, a sample stage 108 for supporting a sample under analysis, a light detector (or image sensor) 112 configured for generating excitation light 114, various optics for defining (i.e., establishing or providing) an excitation (or illumination) light path from the light source 104 to the sample, various optics for defining an emission (or detection) light path from the sample to the light detector 112, and a confocal spinning disk 116 (also termed a scanning disk) positionable in an intermediate image plane and simultaneously in the excitation light path and the emission light path. In some embodiments, the confocal microscope 100 may be configured for detecting light reflected (scattered) from the sample at the same wavelength as the light utilized to illuminate the sample. In other embodiments, the confocal microscope 100 may be configured for exciting the sample at a specific excitation wavelength and detecting fluorescent light emitted from the sample at a longer wavelength in response to the excitation. In these latter embodiments, a fluorescent agent or fluorophore (e.g., fluoroscein) is added to the sample as appreciated by persons skilled in the art. For convenience, unless specified otherwise or the context dictates otherwise, the term "excitation" encompasses "illumination" of a sample for the purpose of collecting reflected or scattered light, as well as excitation of a sample for the purpose of collecting fluorescent emission light emitted by the sample.

The sample stage 108 is schematically depicted as a sample plane at which the sample is positioned by the sample stage 108. The sample stage 108 may generally be any platform for supporting a sample, or a sample and a substrate supporting the sample (e.g., a glass slide), in a fixed position thereon. In some embodiments, the sample stage 108 may be movable by manual or motorized actuation. That is, the position of the sample stage 108 may be adjustable by the user along the x-axis, y-axis, and/or z-axis. In the present context, the z-axis is taken to be the optical axis that is orthogonal to the sample plane, and the x-axis and y-axis are taken to lie in the sample plane. The sample may generally be any object for which imaging is desired and which is mountable to the sample stage 108. The sample may be biological (e.g., spores, fungi, molds, bacteria, viruses, biological cells or intracellular components, biologically derived particles such as skin cells, detritus, etc.) or non-biological (e.g., chemical compound, particulate matter, etc.).

The light source 104 may be any light source suitable for confocal microscopy. For example, the light source 104 may be a solid-state light source such as a light emitting diode (LED) or a solid-state laser, or alternatively may be a semiconductor-based laser (laser diode or LD). In some embodiments, the optical output of the light source 104 may be the tip of an optical fiber that is imaged onto (conjugate to) the intermediate image plane where the spinning disk 116 is positioned and the sample plane where the sample is positioned. In some embodiments, the light source 104 may include a plurality of light sources (e.g., multiple LEDs) that generate light at different wavelengths. Such light sources may be mounted to wavelength selector, such as a motorized wheel (not shown) that enables automatic (computerized) selection of the light source and thus the wavelength of the excitation light to be utilized in a given application.

The light detector 112 may be any imaging device suitable for confocal microscopy such as, for example, the type of imaging device that forms the basis of cameras. In typical embodiments, the light detector 112 is a multi-pixel (or pixelated) imaging device such as, for example, a charge-coupled device (CCD) or an active-pixel sensor (APS) based on complementary metal-oxide-semiconductor (CMOS) technology. In some embodiments, the confocal microscope 100 may include an eyepiece (not separately shown) to enable the user to view the sample, in which case appropriate optical components (e.g., beam splitter) are provided to split the emission light path so that the emission light is directed to both the light detector 112 and the eyepiece. Thus, the light detector 112 in FIG. 1 may be considered as schematically representing an imaging device, or both an imaging device and an eyepiece. Alternatively, the light detector 112 may be a broadband light source that operates in conjunction with an excitation filter (not shown) that only allows the desired excitation wavelength of light to pass.

The intermediate optics (optical components) involved in defining the excitation light path and/or emission light path vary widely from one embodiment to another. Depending on the particular optical component, defining a light path may include modifying the light beam in some fashion, such as focusing, inverting, or resizing the light beam, etc. Examples of optics may include, but are not limited to, the optics illustrated in FIG. 1, which are briefly described as follows. In the following description and as used herein generally, the term "lens" may refer to either a single lens or a lens group (a series of lenses), depending on the embodiment and the function of the lens(es), as appreciated by persons skilled in the art.

The excitation light generated by the light source 104 is collimated by a collimating lens 120 and is then incident on a long-pass beam splitter 124 such as a dichroic beam splitter or mirror. The beam splitter 124 is configured to reflect light at the wavelengths contemplated for the excitation light and to transmit light at the wavelengths contemplated for the emission light. In some embodiments, the beam splitter 124 may include a plurality of beam splitters having different optical reflection/transmission characteristics. Such beam splitters may be mounted to wavelength selector, such as a motorized wheel (not shown) that enables automatic (computerized) selection of the beam splitter with the desired reflection/transmission spectrum. The excitation light is reflected by the beam splitter 124 at an angle (e.g., ninety degrees) and is directed through a first relay lens 128 that inverts the image of the excitation light. The excitation light then passes through a window 132 to the front side of the spinning disk 116. The window 132 may be provided to prevent dusty air from coming into contact with the spinning disk 116. Small particles can adhere to the spinning disk 116 with a force great enough to resist centrifugal forces. Moreover, small particles can autofluoresce. Thus, the window 132 is useful for preventing small particles from contributing the image captured by the light detector 112 as artifacts or background. The portion of the excitation light passing through apertures of the spinning disk 116 is transmitted through a field lens 136, a tube lens 140, and an objective lens 144 to the sample on the sample stage 108. The objective lens 144 may be any lens or system of lenses configured for transmitting and focusing the excitation light onto the sample, and collecting the emission light emitted from the sample and focusing the emission light onto the light detector 112.

In response to the illumination (or excitation in fluorescence applications), the sample emits emission light, i.e., scattered/reflected light, or fluorescent light in fluorescence applications. The emission light is transmitted through the objective lens 144, the tube lens 140, and the field lens 136, and is incident on the back side of the spinning disk 116. The portion of the excitation light passing through the apertures of the spinning disk 116 is transmitted through the window 132 and the first relay lens 128. The emission light is then transmitted through the beam splitter 124 without being reflected, and through a second relay lens 148. At least in fluorescence applications, the emission light then passes through an emission filter 152 to block unwanted wavelengths and is focused on the image plane of the light detector 112. In some embodiments, the emission filter 152 may include a plurality of emission filters having different transmission characteristics. Such emission filters may be mounted to wavelength selector, such as a motorized wheel (not shown) that enables automatic (computerized) selection of the filter with the desired transmission spectrum.

The spinning disk 116 generally includes a planar first side 156 and an opposing planar second side 160. The spinning disk 116 is mounted to a shaft or spindle 164 coaxial with the central axis of the spinning disk 116. Rotation of the shaft 164 is powered by a suitable motor (not shown). Examples of the spinning disk 116 are described further below. In some embodiments, the spinning disk 116 is selectively movable into and out from the light paths to enable selection between confocal and wide-field operations.

It will be understood that FIG. 1 is a high-level schematic depiction of an example of the confocal microscope 100 consistent with the present disclosure. Other optics, electronics, and mechanical components and structures not specifically shown in FIG. 1 may be included as needed for practical implementations.

It will also be understood that the confocal microscope 100 illustrated in FIG. 1 may also include a computing device (not shown) communicating with the light detector 112. The computing device may receive images captured by the light detector 112, and digitize and record the images. The computing device may also process captured images as needed for displaying the images on a display device such as a computer screen. The computing device may also be configured for processing the images so as to enhance or control the display of the images in a desired manner. Generally for these purposes, the computing device may include hardware (microprocessor, memory, etc.) and software components as appreciated by persons skilled in the art. For example, the computing device may include a processor such as a main electronic processor providing overall control, and one or more electronic processors configured for dedicated control operations or specific signal processing tasks (e.g., a graphics processing unit, or GPU). The computing device may also include one or more memories (volatile and/or non-volatile) for storing data and/or software. The computing device may also include one or more device drivers for controlling one or more types of user interface devices and providing an interface between the user interface devices and components of the computing device. In addition to a display device, such user interface devices may include other user output devices (e.g., printer, visual indicators or alerts, audible indicators or alerts, and the like) and also user input devices (e.g., keyboard, keypad, touch screen, mouse controller, joystick, trackball, and the like). The computing device may also include one or more types of computer programs or software contained in memory and/or on one or more types of computer-readable media. Computer programs or software may contain instructions (e.g., logic instructions) for performing all or part of any of the methods disclosed herein. Computer programs or software may include application software and system software. System software may include an operating system (e.g., a Microsoft Windows® operating system) for controlling and managing various functions of the computing device, including interaction between hardware and application software. In particular, the operating system may provide a graphical user interface (GUI) displayable via a user output device, and with which a user may interact with the use of a user input device. The computing device may also include one or more data acquisition/signal conditioning components (as may be embodied in hardware, firmware and/or software) for receiving and processing the imaging data captured by the light detector 112, including formatting data for presentation in graphical form by the GUI, generating 3D images, etc.

Figure 2:
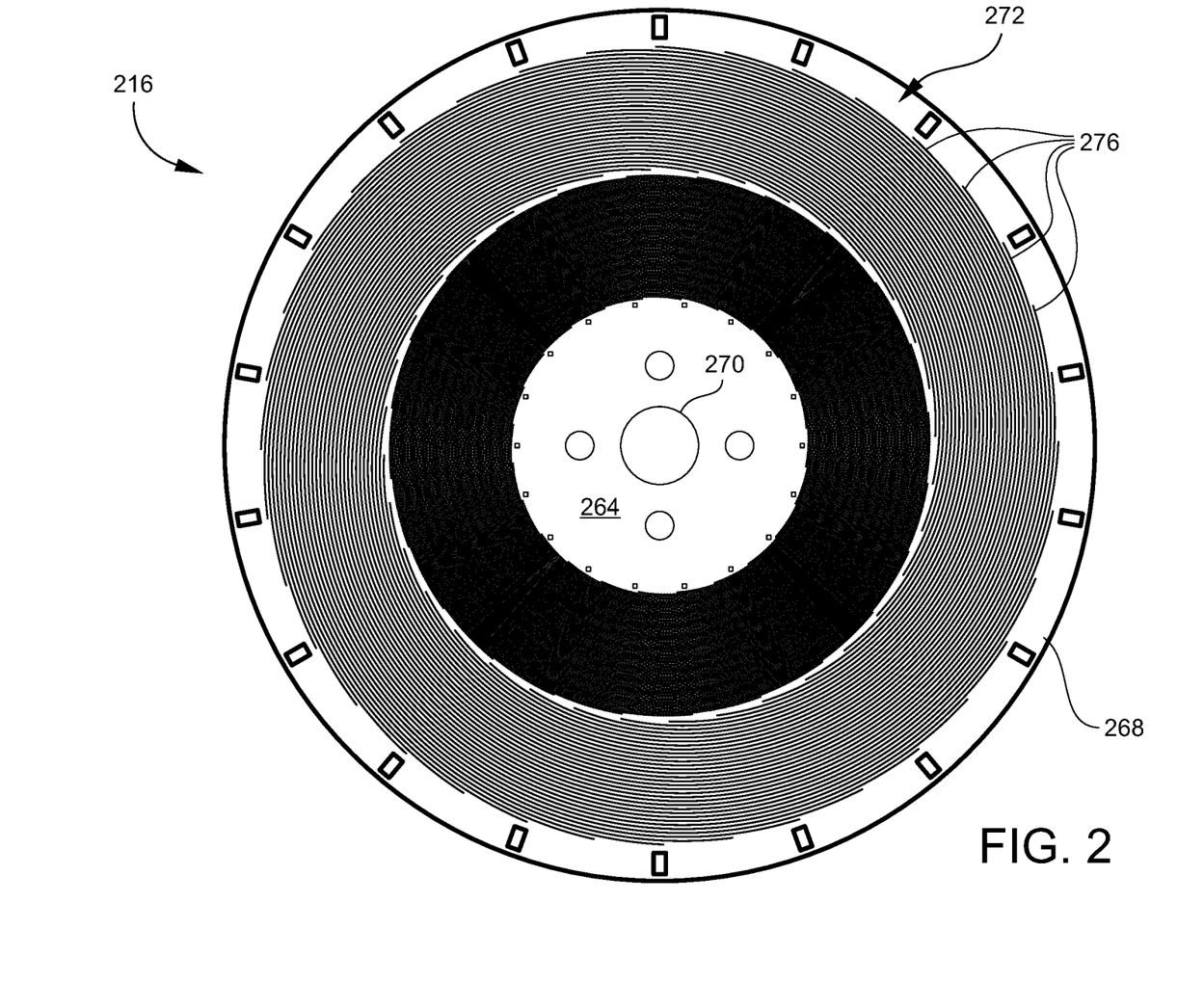
FIG. 2 is a plan view of an example of a spinning disk according to some embodiments.

FIG. 2 is a plan view of an example of a spinning disk 216 according to some embodiments. The plan view may be of either the first side 156 or the second side 160 (FIG. 1) of the spinning disk 216. The spinning disk 216 generally includes a central section 264 and an outer section 268 coaxially surrounding the central section 264. The central section 264 may be configured (e.g., as a hub) for attaching the spinning disk 216 to a shaft (e.g., shaft 164 in FIG. 1) to enable motorized rotation of the spinning disk 216. The shaft may be attached to one side of the central section 264 and/or may pass through a central bore 270 of the spinning disk 216. At least a portion of the outer section 268 is an annular aperture section 272 that also coaxially surrounds the central section 264. Relative to the central axis of the spinning disk 216, the aperture section 272 generally has an inner radius and an outer radius, and spans a radial distance from the inner radius to the outer radius. The aperture section 272 may be, or be formed by, a patterned mask as described further below. The aperture section 272 includes a plurality of apertures 276 arranged along a plurality of spiral paths on the planar face (first side 156 or second side 160) of the spinning disk 216. In the illustrated example the spinning disk 216 includes thirty-six spiral paths but in other examples may include less or more than thirty-six spiral paths. The spiral paths may be arranged adjacent to each other in a multi-start pattern, such that the spiral paths each start at a first radius of the spinning disk 216 (e.g., the inner radius of the aperture section 272) and end at a second radius of the spinning disk 216 greater than the first radius (e.g., the outer radius of the aperture section 272). In some embodiments, the spiral paths may follow (or substantially follow) Archimedean spirals that may be expressed by $r = a + b(\theta)$, where the radius r and angle θ are polar coordinates and the parameters a and b are real numbers. In other embodiments, the spiral paths may be non-Archimedean.

In some embodiments, each aperture 276 is a continuous spiral slit extending along a corresponding spiral path from the start to the end of that spiral path. In other embodiments, each aperture 276 is a spiral segmented spiral slit extending along a corresponding spiral path from the start to the end of that spiral path. In other words, in such embodiment each aperture 276 is a plurality of curved slits of equal size (length and width) positioned at equal distances from each other along one of the spiral paths from the start to the end of that spiral path. In such embodiment, the apertures 276 may be multiple series of slits occupying respective spiral paths. In still other embodiments, each aperture 276 is a plurality of pinholes of equal size (diameter) positioned at equal distances from each other along one of the spiral paths from the start to the end of that spiral path. That is, the apertures 276 may be multiple series of pinholes occupying respective spiral paths.

Figure 3A:
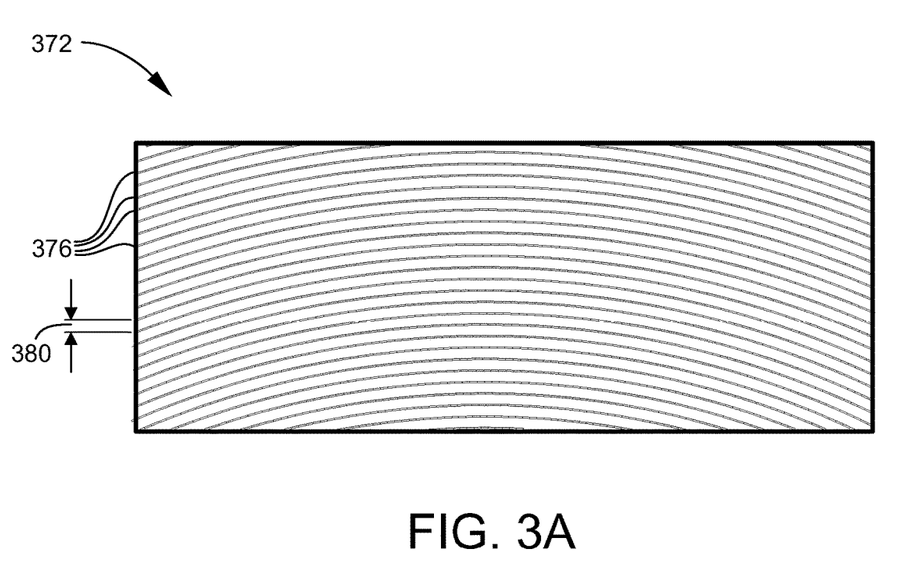
FIG. 3A is a schematic plan view of a portion of an example of an aperture section of a spinning disk according to some embodiments.

FIG. 3A is a schematic plan view of a portion of an example of an aperture section 372 of a spinning disk according to some embodiments. In this embodiment, the apertures 376 of the spinning disk are continuous spiral slits. Adjacent apertures 376 are spaced from each other by a separation distance (or "step" or "pitch") indicated as 380 in FIG. 3A. In some embodiments, the separation distance 380 is on the order of millimeters (e.g., 14 mm). In some embodiments, the separation distance 380 is constant over the entire extent of the spiral paths taken by the apertures 376, while in other embodiments the separation distance 380 may vary. In some embodiments, the width of each spiral aperture 376 (the distance between opposing spiral edges of the aperture 376, i.e., the dimension transverse to the spiral length of the aperture 376) is on the order of micrometers (μm). In one example, the width is in a range from 10 μm to 100 μm. In another example, the width is in a range from 20 μm to 70 μm. In another example, the width is 50 μm. In some embodiments, the width is constant over the entire length of the aperture 376, while in other embodiments the width may vary.

Figure 3B:
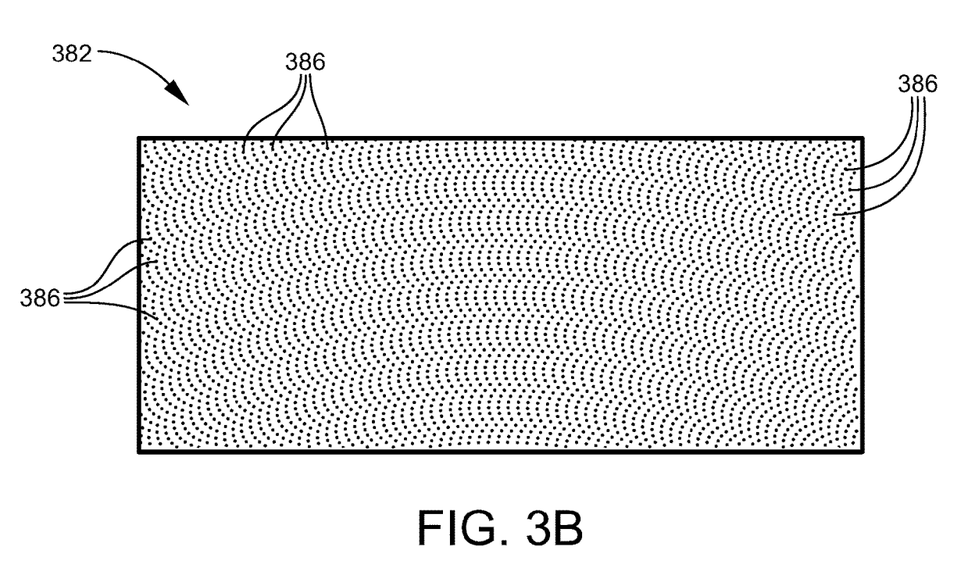
FIG. 3B is a schematic plan view of a portion of an example of an aperture section of a spinning disk according to other embodiments.

FIG. 3B is a schematic plan view of a portion of an example of an aperture section 382 of a spinning disk according to other embodiments. In this embodiment, apertures 386 of the spinning disk are pinholes spaced from each other along the multiple spiral paths. In some embodiments, the diameter of the pinholes is on the order of micrometers. For example, the diameter of the pinholes may be on the same scale as the widths of slit apertures 376 (FIG. 3A) given above.

Generally, there is considered to be a trade-off in desirable optical properties when selecting between slit apertures and the more traditional pinhole apertures for spinning disks. Slit apertures may provide relatively brighter illumination of the sample and a more intense emission signal for the light detector 112 (FIG. 1), whereas pinhole apertures may provide relatively better axial (z-axis) resolution. For a spinning disk having a typical pattern of typically-sized pinholes, the insertion loss of the spinning disk (i.e., the loss in intensity of transmitted light resulting from the presence of the spinning disk in the light paths) has been calculated to be as high as 94%. Hence for some applications, including fluorescence applications, slit apertures may be preferred. In particular, it is seen that continuous slit apertures provide improved open-area ratio (OAR) and reduced insertion loss. This in turn reduces the exposure time required to attain a desired optical signal, thereby reducing image acquisition time and increasing system throughput.

Figure 4:
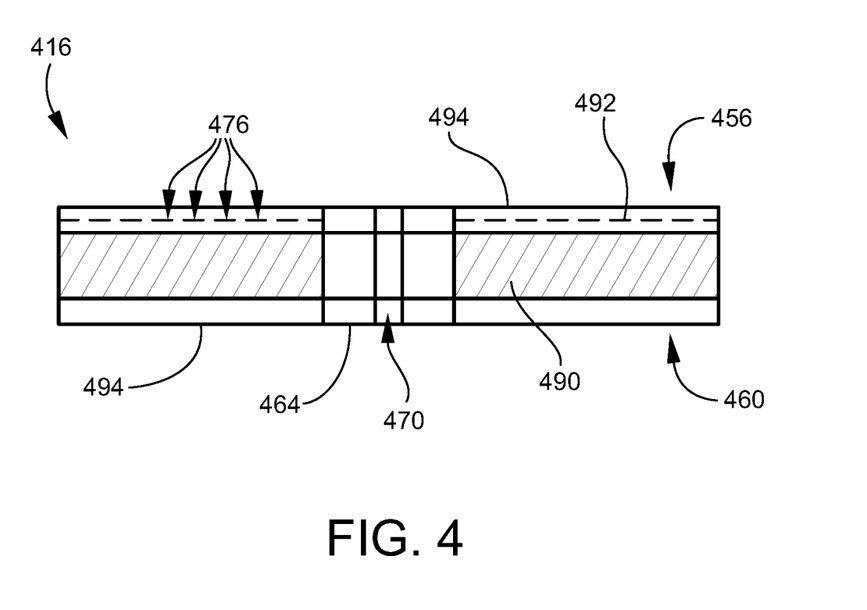
FIG. 4 is a schematic cross-sectional view of a spinning disk according to some embodiments.

FIG. 4 is a schematic cross-sectional view of a spinning disk 416 according to some embodiments. The spinning disk 416 may include a planar first side 456, an opposing planar second side 460, and a central bore 470. The thickness of the spinning disk 416 is defined between the first side 456 and the second side 460. The spinning disk 416 may further include a disk-shaped substrate 490 largely dictating the overall dimensions of the spinning disk 416, and a patterned mask 492. The substrate 490 includes a planar first surface and an opposing planar second surface corresponding to the first side 456 and the second side 460, respectively. The thickness of the substrate 490 extends from the first surface to the second surface along a direction orthogonal to the first surface and second surface. In some embodiments, the thickness of the substrate 490 is in a range from 0.5 mm to 2 mm. In some embodiments, the substrate 490 may include a central section 464 that is distinct from the substrate 490 and may be composed of a different material. The patterned mask 492 includes a spiral pattern or arrangement of apertures 476 as described above. The patterned mask 492 disposed on either the first surface or the second surface of the substrate 490.

Generally, it is desirable to minimize reflectance of light incident on the surface of the patterned mask 492 so as to minimize the amount of "ghost" light that contributes to background noise in the confocal images captured by the light detector 112 (FIG. 1). In some embodiments, the patterned mask 492 may be composed of a suitable optically black (low-reflective) material. Examples of black materials include, but are not limited to, chrome-based materials, i.e., materials based on chromium oxide ($Cr_2O_3$) or based on a mixture of chromium (Cr) and $Cr_2O_3$ such as black chrome and blue chrome. Examples of black materials include, but are not limited to, chrome-based materials, i.e., materials based on chromium oxide ($Cr_2O_3$) or based on a mixture of $Cr_2O_3$ and other species such as chromium (Cr) and silicon dioxide ($SiO_2$), a few examples being black chrome and blue chrome. Other inorganic compounds or alloys that are suitably black may also be utilized.

In some embodiments, the patterned mask 492 is a thin layer (or film, coating, etc.) having a thickness on the order of micrometers. For example, patterned mask 492 may have a thickness in a range from 0.1 μm to 0.3 μm. The patterned mask 492 may be fabricated by any technique suitable for its composition and thickness. For example, the patterned mask 492 may be prefabricated and then laminated on the substrate 490. As other examples, the patterned mask 492 may be formed on the substrate 490 by a microfabrication process such as, for example, electroplating, vacuum deposition (chemical vapor deposition or CVD, physical vapor deposition or PVD, etc.), evaporation, or by a wet coating technique (e.g., spray coating, dip coating, spin-on coating, etc.). In some embodiments, the patterned mask 492 may be formed by first depositing a continuous layer and thereafter patterning the layer to form the apertures 476 by any suitable technique such as photolithography (e.g., masking and etching).

Generally, the substrate 490 may be composed of any optically transparent material suitable for use in a confocal microscope. Examples of materials for the substrate 490 include, but are not limited to, various glasses and quartz (including fused quartz), as well as certain optically transparent polymers. One non-limiting example of glass is borosilicate glass, such as BOROFLOAT® glasses available from SCHOTT North America, Inc., Louisville, Ky., USA.

According to certain embodiments disclosed herein, the substrate 490 is a low-autofluorescence substrate. In such embodiments, the substrate 490 is composed of a low-autofluorescence material. Examples of low-autofluorescence materials include, but are not limited to, glasses available from SCHOTT North America, Inc., Louisville, Ky., USA, having the product designations N-SF57HT, N-FK51A, N-KZFS8, N-BK7, and N-KZFS5. Generally, the low-autofluorescence material should be a high-purity grade optical material so as to minimize or eliminate color centers in the material that result in autofluorescence. In some embodiments, a material disclosed herein as being low-autofluorescence material has a concentration of impurities of transition metals and rare earth elements of 20 ppm or less.

In some embodiments, to further lower the reflectivity of the spinning disk 416, the spinning disk 416 may include an anti-reflective (AR) layer or coating 494 that conformally coats (covers) the first side 456 and the second side 460. Generally, the anti-reflective layer 494 may be any material or multilayer stack of materials exhibiting effective anti-reflective characteristics for the spectrum of wavelengths contemplated by the present disclosure (e.g., from 350 nm to 700 nm, or about 350 nm to about 700 nm). Examples of materials suitable for use as anti-reflective layers include, but are not limited to, certain metal fluorides, metal oxides, and metalloid oxides, such as magnesium fluoride ($MgF_2$), lithium fluoride (LiF), calcium fluoride ($CaF_2$), sodium fluoride (NaF), silicon dioxide ($SiO_2$), yttrium oxide ($Y_2O_3$), and hafnium oxide ($HfO_2$), as well as alternating combinations of two or more of the foregoing.

In some embodiments, the anti-reflective layer 494 is a high-performance anti-reflective layer. One non-limiting example of a high-performance anti-reflective layer is a material having an average reflectance (Rav) of less than or equal to 0.3% (Rav≤0.3%) over a wavelength range of 380 nm to 710 nm, and a maximum reflectance (Rmx) of less than or equal to 1% (Rmx≤1%) over the wavelength range of 380 nm to 710 nm. The high-performance anti-reflective layer may comprise one of (or a combination of two or more of) the fluoride materials and/or oxide materials noted above. Certain materials that are otherwise effective as anti-reflective layers exhibit unacceptably high autofluorescence due to presenting color centers, which are due to the presence of rare earth elements and other impurities in the material. One example of such a material is $MgF_2$. In some embodiments, the high-performance anti-reflective layer comprises one or more $MgF_2$ layers (or layers of other AR materials exhibiting autofluorescence) separated in an alternating fashion with layers of a different composition such as, for example, $SiO_2$. The thickness of the $MgF_2$ layer (or other AR material exhibiting autofluorescence), or the overall thickness of the $MgF_2$ layers collectively, is minimized to reduce autofluorescence. Such materials are referred to herein as low-autofluorescence anti-reflective materials. In some embodiments, the high-performance low-autofluorescence anti-reflective layer may be a coating material available from Penn Optical Coatings, LLC, Pennsburg, Pa., USA, having the product designations MD-FS-1001, MD-15-15771-01-A, and MD-15-15771-01-B.

Typically, the anti-reflective layer 494 is a thin layer (on the order of micrometers) applied by a vacuum deposition process. In some embodiments, the anti-reflective layer 494 may be formed by applying the anti-reflective material to the substrate 490, followed by forming the patterned mask 492, followed by again applying the anti-reflective material so as to conformally coat the patterned mask 492. As a result, the patterned mask 492 is embedded in the anti-reflective coating 494, as illustrated in FIG. 4. In other embodiments, the patterned mask 492 may first be formed directly on the substrate 490, followed by applying the anti-reflective coating 494 so as to conformally cover the patterned mask 492 and exposed surfaces of the substrate 490.

The same or similar type of anti-reflective layer may be applied to the surfaces of any of the other optical components of the confocal microscope 100 (FIG. 1), particularly optical components positioned such that incident light reflected from them may propagate back to the light detector 112. For example, in some embodiments the window 132 and/or the field lens 136 may have conformal anti-reflective layers. Moreover, the substrate of the window 132 and/or the field lens 136 may be a low-autofluorescence substrate as described above.

It will be understood that in the fabrication methods described herein, prior to forming any layer on an underlying surface, additional steps may be taken as needed to prepare the underlying surface such as, for example, cleaning, etching, planarizing (e.g., lapping or polishing), dehydration, surface functionalization (e.g., adhesion promotion, passivation, etc.), etc. Such additional steps may or may not result in the formation of an additional, identifiable thin film on the underlying surface. Such additional thin films, if present in practice, are not specifically shown in the drawing figures.

As noted, the above-described approaches taken to reduce reflectance and autofluorescence from the spinning disk 416 and/or other optical components reduce the "ghost" light captured by the light detector 112 (FIG. 1). This enables an increase the signal-to-background ratio for a given exposure time, or a reduction in the exposure time required to attain a desired signal-to-background ratio. Reducing the background improves image contrast and improves assay results. Reducing the exposure time reduces the image acquisition time and thus increases system throughput.

Figure 5:
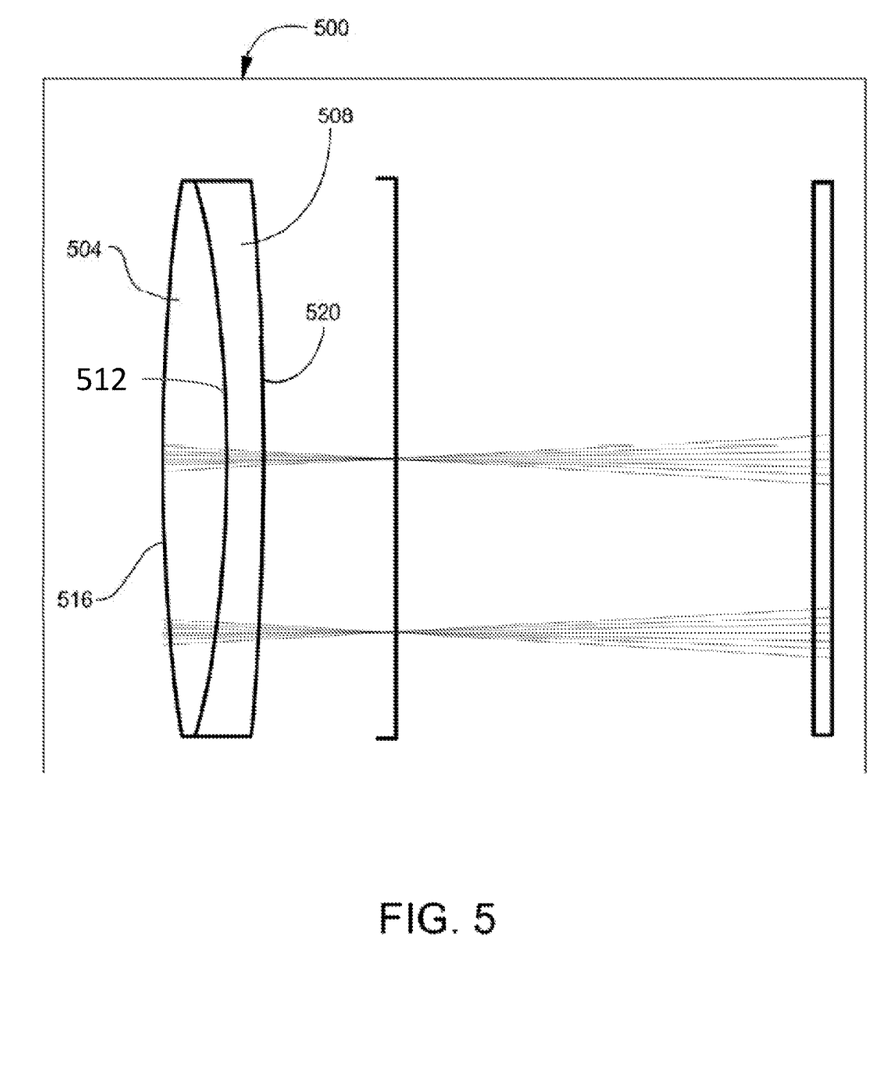
FIG. 5 is a side view of an example of a doublet according to some embodiments.

FIG. 5 is a perspective view of an example of a lens doublet 500 according to some embodiments. One or more of the optical components of a microscope, such as described above and illustrated in FIG. 1, may be configured as a doublet, one non-limiting example being the field lens 136. The doublet 500 includes a first substrate or lens 504 and a second substrate or lens 508 bonded to the first substrate 504 at an interface 512. Thus, the doublet 500 includes a first outer surface 516 corresponding to the outer surface of the first substrate 504, and a second outer surface 520 corresponding to the outer surface of the second substrate 508. The thickness of the doublet 500 through which the optical axis passes is defined between the first substrate 504 and the second substrate 508. The first substrate 504 and the second substrate 508 are bonded together at their inner surfaces, thereby defining the interface 512. The first substrate 504 and the second substrate 508 may have different lens configurations. For example, in the illustrated embodiment the first substrate 504 is a crown lens and the second substrate 508 is a flint lens, cooperatively forming an achromatic doublet.

In some embodiments, the first substrate 504 and/or the second substrate 508 is a low-autofluorescence substrate, and thus may be composed of a low-autofluorescence substrate material as described above. The respective materials of the first substrate 504 and the second substrate 508, whether or not those materials are low-autofluorescence materials, may have the same composition or different compositions. The TABLE below provides six examples of a field lens doublet in which one or both of the first substrate 504 and the second substrate 508 are composed of a low-autofluorescence material.

| Surface | Radius | Thickness | Glass |
|---|---|---|---|
| 1 | 91.62609 | 3.6 | N-KZFS8 |
| 2 | −50.3292 | 2 | N-BK7 |
| 3 | 62.66428 | | |
| 1 | 69.65163 | 3.6 | N-KZFS8 |
| 2 | −69.1317 | 2 | N-BK7 |
| 3 | 47.8353 | | |
| 1 | 109.2583 | 2 | N-KZFS5 |
| 2 | −64.786 | 3.6 | Silica |
| 3 | 83.03165 | | |
| 1 | 115.012 | 3.6 | Silica |
| 2 | −61.206 | 2 | N-KZFS5 |
| 3 | −154.59 | | |
| 1 | 75.51843 | 3.6 | N-SF57HT |
| 2 | −923.263 | 2 | N-FK51A |
| 3 | 62.11698 | | |
| 1 | −110.061 | 2 | N-FK51A |
| 2 | 227.5433 | 3.6 | N-SF57HT |
| 3 | −56.2784 | | |

Generally, the first substrate 504 and the second substrate 508 may be bonded together by any suitable optically transparent bonding agent (e.g., adhesive, glue, cement, etc.). The bonding agent may be considered to be a film located at the interface 512. In some embodiments, the bonding agent is a low-autofluorescence bonding agent. Examples include, but are not limited to, silicone-based bonding agents. Other examples include, but are not limited to, mercapto-ester based optical adhesives and optical adhesives available from Norland Products Inc., Cranbury, N.J., USA, having the product designations NOA 63, NOA 81, and NOA 83.

In some embodiments, the doublet 500 includes an anti-reflective layer conformally coating the first outer surface 516 and the second outer surface 520. The anti-reflective layer may be a high-performance anti-reflective layer or a low-autofluorescence anti-reflective layer as described above.

For purposes of the present disclosure, it will be understood that when a layer (or film, region, substrate, component, device, or the like) is referred to as being "on" or "over" another layer, that layer may be directly or actually on (or over) the other layer or, alternatively, intervening layers (e.g., buffer layers, transition layers, interlayers, sacrificial layers, etch-stop layers, masks, electrodes, interconnects, contacts, or the like) may also be present. A layer that is "directly on" another layer means that no intervening layer is present, unless otherwise indicated. It will also be understood that when a layer is referred to as being "on" (or "over") another layer, that layer may cover the entire surface of the other layer or only a portion of the other layer. It will be further understood that terms such as "formed on" or "disposed on" are not intended to introduce any limitations relating to particular methods of material transport, deposition, fabrication, surface treatment, or physical, chemical, or ionic bonding or interaction. The term "interposed" is interpreted in a similar manner.

In general, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A microscope, comprising:
   a light source configured for producing excitation light;
   a sample stage configured for supporting a sample at a sample plane;
   a light detector configured for acquiring an image of the sample; and
   optics defining an excitation light path from the light source to the sample plane, and an emission light path from the sample plane to the light detector,
   wherein the optics comprise an optical component, and the optical component comprises a substrate, and a high-performance anti-reflective coating on the substrate,
   wherein the substrate is a spinning disk positioned at an intermediate image plane in the excitation light path and the emission light path.

2. The microscope of claim 1, wherein the spinning disk comprises a low-autofluorescence substrate.

3. The microscope of claim 2, wherein the anti-reflective coating is a low-autofluorescence anti-reflective layer.

4. The microscope of claim 1, wherein the substrate comprises a low-autofluorescence substrate as a first substrate, and the optical component further comprises a second substrate bonded to the first substrate by a bonding agent.

5. The microscope of claim 4, wherein the second substrate is a low-autofluorescence substrate.

6. The microscope of claim 4, wherein the bonding agent is a low-autofluorescence bonding agent.

7. The microscope of claim 1, wherein the spinning disk comprises a plurality of apertures, and wherein the optics define an excitation light path from the light source, through the apertures of the spinning disk and to the sample plane, and an emission light path from the sample plane, through the apertures and to the light detector.

8. The microscope of claim 7, wherein the spinning disk comprises a patterned mask in which the apertures are formed.

9. The microscope of claim 7, wherein the plurality of apertures are arranged along a plurality of spiral paths.

10. The microscope of claim 9, wherein the plurality of apertures is selected from the group consisting of:
    the plurality of apertures is a plurality of slits, each slit continuously extending along a corresponding one of the spiral paths;
    the plurality of apertures is a plurality of groups of pinholes, wherein the pinholes of each group are arranged and spaced from each other along a corresponding one of the spiral paths; and
    the plurality of apertures is a plurality of groups of slits, wherein the slits of each group are arranged and spaced from each other along a corresponding one of the spiral paths.

11. The microscope of claim 8, comprising an anti-reflective layer coating the patterned mask.

12. The microscope of claim 1, wherein the optics comprise a component selected from the group consisting of:
    an emission filter in the emission light path;
    an emission filter in the emission light path, the emission filter configured for transmitting a selected fluorescent wavelength and substantially blocking other wavelengths;

an emission filter in the emission light path, and comprising a low-autofluorescence substrate;
an emission filter in the emission light path, and comprising a low-autofluorescence substrate and an anti-reflective layer coating the low-autofluorescence substrate;
a window in the emission light path;
a window in the emission light path, and comprising a low-autofluorescence substrate;
a window in the emission light path, and comprising a low-autofluorescence substrate and an anti-reflective layer coating the low-autofluorescence substrate;
a field lens in the emission light path;
a field lens in the emission light path, and comprising a low-autofluorescence substrate;
a field lens in the emission light path, and comprising a low-autofluorescence substrate and an anti-reflective layer coating the low-autofluorescence substrate;
a field lens in the emission light path, and comprising a first substrate and a second substrate bonded to the first substrate by a bonding agent, wherein at least one of the first substrate and the second substrate is a low-autofluorescence substrate;
a field lens in the emission light path, and comprising a first substrate and a second substrate bonded to the first substrate by a low-autofluorescence bonding agent, wherein at least one of the first substrate and the second substrate is a low-autofluorescence substrate;
a field lens in the emission light path, and comprising a first substrate, a second substrate bonded to the first substrate by a bonding agent, and an anti-reflective layer coating the first substrate and the second substrate; and
a combination of two or more of the foregoing.

13. The microscope of claim 1, comprising a sample stage configured for supporting the sample at a sample plane.

14. A method for acquiring microscopic images of a sample, the method comprising:
operating the microscope of claim 1 to irradiate a sample with excitation light and collect emission light emitted by the sample,
wherein at least one of the excitation light and the emission light passes through the optical component comprising the substrate and the high-performance anti-reflective coating on the substrate including a spinning disk positioned at an intermediate image plane in the excitation light path and the emission light path.

15. The method of claim 14, wherein the emission light is fluorescent emission light.

16. The microscope of claim 1, wherein the optical component is selected from the group consisting of:
a field lens positioned in at least one of the excitation light path and the emission light path;
a window positioned in at least one of the excitation light path and the emission light path; and
a combination of two or more of the foregoing.

17. An optical component for a microscope, the optical component comprising a substrate and a high-performance anti-reflective coating the substrate including a spinning disk positioned at an intermediate image plane in the excitation light path and the emission light path.

* * * * *